R. L. STEWART.
METHOD OF HANGING SAWS.

No. 41,544. Patented Feb. 9, 1864.

Witnesses

Inventor
R. L. Stewart

UNITED STATES PATENT OFFICE.

R. L. STEWART, OF OWASSO, MICHIGAN.

IMPROVEMENT IN METHOD OF HANGING SAWS.

Specification forming part of Letters Patent No. 41,544, dated February 9, 1864.

*To all whom it may concern:*

Be it known that I, R. L. STEWART, of Owasso, in the county of Shiawassee and State of Michigan, have invented a new and useful Improvement in Hanging Reciprocating Saws; and I do hereby declare that the following is a full, clear, and exact description of the same, reference being had to the accompanying drawings, making a part of this specification, in which—

Figure 1:
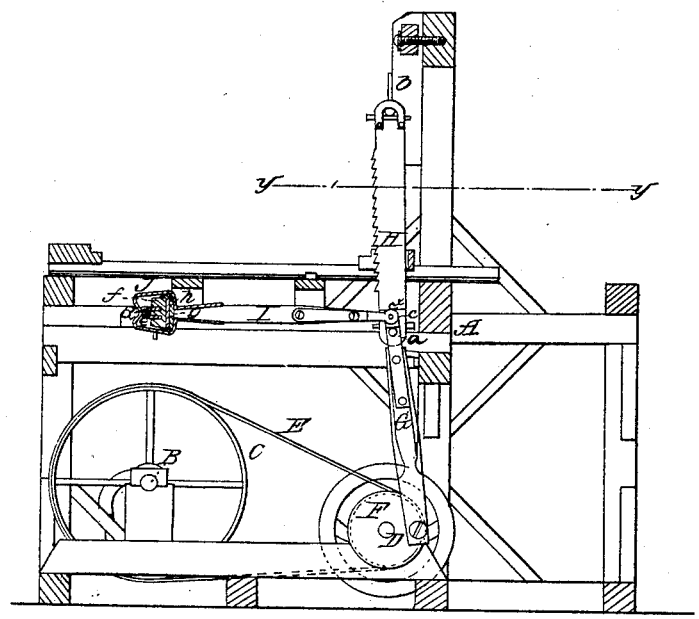
Figure 2:
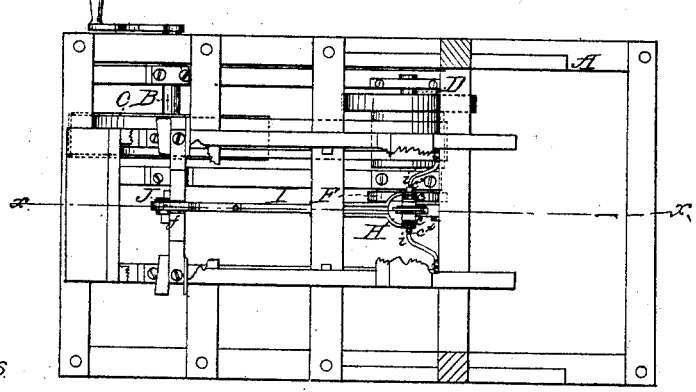

Figure 1 is a side sectional view of my invention, taken in the line *x x*, Fig. 2.; Fig. 2, a horizontal section of the same, taken in the line *y y*, Fig. 1.

Similar letters of reference indicate corresponding parts in the two figures.

This invention consists in the application of a horizontal pitman to a reciprocating saw in such a manner that the saw during its upward movement will be moved back in the kerf to admit of the free escape of sawdust, and during its downward movement be kept in proper contact with the stuff or work at the front of the kerf, so as to operate effectually. The invention is designed to supersede the slides and other appliances hitherto used for the purpose, by reducing friction and dispensing with complexity and expense in construction.

To enable those skilled in the art to fully understand and construct my invention, I will proceed to describe it.

A represents a framing, which may be constructed in any proper manner to support the working parts of the device.

B represents a shaft on which a driving-pulley, C, is placed, and D is a shaft driven from shaft B through the medium of a belt, E, said shaft D having a crank-pulley, F, on its inner end, to which the lower end of a pitman, G, is attached, the upper end of said pitman being attached to the lower end of the saw H by a pivot, *a*, as shown clearly in Fig. 1. The upper end of the saw H works between guides *b b* at the upper part of the framing A, and the upper end of the pitman G is forked, so as to have an arm, *c*, at each side of the saw H, and the upper ends of these arms *c* are connected by pivots $c^x$ to the arms of a pitman, I, which I term a "horizontal pitman." The two pitmen G I, it will be seen, are connected above the pivot *a*, which secures the upper end of the pitman G to the saw. (See Fig. 1.)

The pitman I, at the end opposite to that which is connected to the pitman G, has a cam, J, attached to it of skeleton form, as shown in Fig. 1. The back part of this cam J is bent or curved so as to form a rounded inward prominence, *d*, which works against a rounded prominence, *e*, which projects horizontally from a cross-bar, *f*, in the framing A, and at the opposite side of said bar *f* there is attached a convex plate, *g*, against which a convex surface, *h*, at the front side of the cam J, works.

From the above description it will be seen that as the pitman G operates the saw H—that is to say, works it up and down—the saw will have a forward and backward movement communicated to it, in consequence of the upper end of the pitman G being connected to the pitman I above the pivot *a*, which connects the pitman G to the saw. As the pitman G rises and raises the saw H, it moves the latter backward in the kerf, and during the downward movement of the pitman and saw the latter is kept forward to its work. The cam J, arranged as shown, in connection with the prominence *e* and convex surface or plate *g*, admits of a certain degree of longitudinal play or movement of the pitman I, which renders the operation of the pitman perfect.

Thus, by this simple arrangement, a very efficient means is obtained for giving the saw the two combined movements described, and one which operates with but little friction, and is capable of being applied at a very moderate expense and at either end of the saw.

Having thus described my invention, what I claim as new, and desire to secure by Letters Patent, is—

The pitman I and pitman G, when constructed to operate together in relation to the saw, in combination with the cam J, projection *e*, convex plates *g* and *h*, and cross-bar *f*, substantially as described, and for the purposes set forth.

R. L. STEWART.

Witnesses:
A. H. BYRELY,
D. LYON THORPE.